United States Patent Office 2,754,189
Patented July 10, 1956

2,754,189

SOIL TREATMENT WITH GREEN SULFONIC ACID AMMONIUM SALTS

Stanford J. Hetzel, Cheltenham, Pa., assignor to Sun Oil Company, Philadelphia, Pa., a corporation of New Jersey No Drawing. Application April 6, 1954, Serial No. 421,427

2 Claims. (Cl. 71—27)

This invention relates to plant growth promotion.

In accordance with the present invention, petroleum green acid ammonium salts are used to promote the growth of plants.

It is well known in the art to produce water-soluble, oil-insoluble green sulfonic acids by the sulfonation of mineral oil. Additionally, it is well known to prepare the ammonium salts of these green acids.

According to this invention, it is now proposed to treat soil wherein plants are grown with these green acid ammonium salts in order to promote the growth of such plants. It has surprisingly been discovered that appreciable plant growth increases may be obtained through the application of relatively small amounts of green acid ammonium salts to the soil wherein plants are grown. It has still further been discovered that the growth of substantially any type of plant may be enhanced by treatment in accordance with this invention, including plants grown for food, or for appearance, or plants having other utility.

In carrying out this invention the green acid ammonium salts can be applied to the soil in the form of a dry powder by broadcasting on the surface of soil followed, if desired, by plowing under; or the salts may be applied by shallow drilling, or by similar procedures known to those in the art. In other instances it may be desirable to apply the green acid salts in aqueous solution as, for example, in irrigation water. Under certain circumstances it may be advantageous to apply the green acid ammonium salts in admixture with other plant treating compounds such as herbicides, larvacides, and the like.

While any application of the green acid ammonium salts to plant-growing soil will effect some plant growth promotion, it is preferred to treat the soil with sufficient quantities of these salts to obtain material plant growth increases. Generally, where plants are grown on a larger scale such as in most farming operations, the addition of about 10 to 100 pounds of green acid ammonium salts to an acre of crop growing soil is sufficient for at least one growing season to effect substantial plant growth promotion and crop yield increases. The circumstances of the individual application, however, regulate to a considerable extent the amount of growth promoting material necessarily required for effective soil treatment. Quantities of green acid ammonium salts considerably in excess of 100 pounds per acre, as for example, amounts up to 500 pounds per acre or more, may be used in heavily cultivated truck farming applications, or in regions of extremely poor soil.

Climatic conditions affect to some extent the practice of this invention. The growth promoting material is more rapidly leached from the soil in areas having high humidity and thus larger amounts are required in such localities. In addition, the type of plant treated will affect somewhat the effective practice of this invention as will the rate at which the green acid ammonium salts are utilized as plant nutrient as hereinafter explained.

The green acid ammonium salts are most advantageously applied immediately prior to or shortly after initiation of plant growth in order to obtain maximum growth increases. The period of time during which a particular treatment remains effective is contingent upon the amount of growth promoting material initially used as well as upon such above-described factors as local humidity, type of plant treated, condition of the soil, and so forth.

The ammonium salts of green acids are believed to act in two ways to promote plant growth: they act both as a source of plant nutrient and as an agent for facilitating utilization of this other nutrient by plants.

A fertilizing action is believed to result from the use of the green acid ammonium salts, in that these salts provide plants with nitrogenous nutrient which is vital to plant life and growth. Although some of the green acid ammonium salts may be directly absorbed by the plants, it is probable that less complex decomposition products of these salts are formed which are more suitable as plant nutrient. The action of microorganisms and/or the effect of such factors as light and heat are thought to cause a portion of the green acid ammonium salts to break down or decompose to form products such as ammonia and various ammonium compounds which are more readily utilized as plant nutrient.

In addition to the foregoing fertilizing action, green acid ammonium salts act as wetting agents or surfactants to lessen the resistance of the soil to the passage of water and soluble nutrient. Wettability of the soil is increased permitting greater and more uniform soil moisture absorption, and movement of water and soluble nutrient through the soil to plant roots is facilitated. The green acid ammonium salts alter the characteristics of the contact surface between the aqueous medium and the soil particles to permit increased penetration and dispersion of such aqueous medium in the soil. Over the course of plant life a greater amount of water and nutrient come in contact with plant roots and are utilized in the plant growth processes in accordance with this invention. A portion of such utilized nutrient is derived from the green acid ammonium salts themselves, as hereinbefore described; and the remainder is more readily derived from other nutrient sources by virtue of the wetting action of the green acid ammonium salts.

The green acid ammonium salts used in accordance with this invention may be derived from substantially any of the mineral oil fractions normally used to produce green acids as practiced in the petroleum refining art. It is preferable, however, to use the green acid salts obtained from the sulfonation of lighter mineral oil fractions since these salts generally will contain a relatively greater percentage of nitrogen than will the corresponding salts obtained from heavier stocks. Prior to use the green acid ammonium salts preferably are deoiled although complete deoiling is not essential for practicing the invention.

The following example illustrates the invention:

A naphthenic lubricating oil was sulfonated by contact with a gaseous mixture of sulfur trioxide diluted in nitrogen under sulfonating conditions. The mineral oil charged had the following properties:

S. U. viscosity @ 100° F_____ 56.11
Density 20° C./4° C_____ 0.9255
Boiling range, ° C_____ 250–395
Approximate percentage of aromatics_____ 35

About 25 pounds of sulfur trioxide were consumed per barrel of oil charged. An acid sludge layer comprising 17.9% of the reaction mixture was obtained, which acid sludge contained about 25% oil. The acids therein had a combining weight of about 330. The acid sludge layer was separated, neutralized with an excess of ammonium hydroxide, deoiled with iso-octane and dried. The resulting green acid ammonium salts were in the form of a dry brown powder, and contained 3.56% nitrogen by weight.

These green acid ammonium salts were applied to the soil adjacent a Coleus plant for three weeks in aqueous solution at a rate of about 100 cc. of 0.2% solution per week. The soil area treated was about 12.5 square inches. At the end of this time, plant growth had increased as evidenced by the appearance of new growth.

I claim:

1. The method of promoting the growth of plants which comprises treating the soil in which the plants are grown with green sulfonic acid ammonium salts.

2. The method of promoting the growth of plants which comprises admixing green sulfonic acid ammonium salts with the soil wherein the plants are grown.

References Cited in the file of this patent

UNITED STATES PATENTS

| | | |
|---|---|---|
| 1,935,666 | Ramayya | Nov. 21, 1933 |
| 2,559,439 | Jones et al. | July 3, 1951 |